Patented Feb. 25, 1941

2,233,178

UNITED STATES PATENT OFFICE 2,233,178

ICE CREAM AND METHOD OF MAKING SAME

Herbert E. Otting, Westerville, and James J. Quilligan, Columbus, Ohio, assignors to M & R Dietetic Laboratories, Inc., a corporation of Ohio No Drawing. Application January 6, 1939, Serial No. 249,634

7 Claims. (Cl. 99—136)

This invention relates to ice cream and other frozen food products containing a high percentage of milk solids not fat and to the method of making the same.

It has long been a problem in the ice cream making industry to make an ice cream having a high percentage of milk solids not fat which is free from precipitated and crystallized lactose or milk sugar. In the preparation of such products, it appears that the addition of milk solids not fat causes the lactose or milk sugar inherently present therein to be brought to such a high percentage in relation to the water content of the mixture that precipitation and crystallization of part of the lactose or milk sugar takes place at the temperature of the frozen product. The resulting product, therefore, while high in milk solids not fat, has an objectionable rough or sandy consistency which, in the trade, is termed "sandiness." This so-called "sandiness" appears to develop, in particular, from shocks resulting from melting and freezing of the high solids not fat ice cream in serving cabinets. As a result of many experiments, it has been ascertained that if an ice cream mix contains more than a certain percentage of milk solids not fat, in excess of about 11½ to 12%, the finished ice cream will possess the objectionable "sandiness." Slightly more than one-half of the milk solids not fat is normally lactose or milk sugar, and thus when the percentage of lactose or milk sugar in the mix exceeds about 5.90% to about 6.50%, lactose crystallizes in the finished ice cream and imparts thereto the objectionable "sandiness."

Various methods have heretofore been employed to overcome this objectionable "sandiness" and obtain a high solids not fat product having the desired smooth consistency. As an example, gelatin has been added to the ice cream mix to retard or eliminate the crystallization of the lactose or milk sugar. Aside from the fact that the results were not satisfactory, the use of gelatin is objectionable because it enhances the cost of production, is not obtainable in uniform quality and besides it sometimes carries undesirable bacteria with consequent contamination of the ice cream. As another example, an ice cream mix is prepared with only part of the desired amount of milk solids not fat therein and this mix is then partially frozen. To the partially frozen ice cream, the additional desired amount of milk solids not fat is incorporated in the form of skim milk powder. This method also is objectionable from the cost standpoint and also because that portion of the lactose or milk sugar which is present in the skim milk powder added to the partially frozen mix, enters the product and remains therein in an undissolved condition.

We have found that, by operating in accordance with the present invention, we can produce an ice cream having in excess of 12% milk solids not fat, say, in the order of about 15 or 16% and even higher, and at the same time possessing a smooth consistency free from "sandiness." From tests conducted by us, it appears that all of the lactose or milk sugar present in our frozen ice cream is in a dissolved state.

In accordance with the present invention, we employ in the preparation of the ice cream or other frozen product, milk solids not fat which have been treated with a base exchange material. The base exchange material may be natural or artificial zeolitic materials, such as zeolites or glauconite, the materials known in the trade as "Permutit," "Refinite," "Crystallite" and the like; or base exchange materials prepared from normally inert materials which have been specially treated and activated, as described in Patent No. 1,954,769 to John F. Lyman; in Patent No. 2,045,097 to one of us; in Patent No. 2,072,903 to one of us and Edwin H. Browne; and in Patent No. 2,102,642 to one of us, Edwin H. Browne and Maurice E. Hull.

In carrying out our invention, the milk solids not fat in the form of a liquid milk product, such as whole milk, skim milk, sweetened condensed whole or skim milk, condensed plain whole or condensed plain skim milk, or the like, are treated with or without prior acidification with an active base exchange material. The treatment may be effected in any desirable manner, either as a batch or continuous process. Thus, we may charge whole milk or like products containing milk solids not fat into a vessel provided with a suitable amount of fine grained base exchange material and effect contact as by agitation of the mixture in any desirable manner, as in a churn or the like; or the whole milk and like products containing milk solids not fat may be passed downwardly or upwardly through a bed of base exchange material which, if desired, may be provided with agitators to agitate or stir the bed of base exchange material at intervals. If desired, the liquid milk product may be heated preliminarily prior to contact with the bed of base exchange material to aid in facilitating passage thereof through the bed.

The liquid milk product containing milk solids not fat treated as above described may be used as such, or in evaporated or dessicated and powdered form, as a constituent in the manufacture of the ice cream. Due to the use of base exchange treated milk solids in an ice cream in accordance with our invention, we can incorporate more than the usual 11½ to 12% milk solids not fat (having the usual proportion of lactose) in the ice cream mix which, on freezing and even after prolonged periods in storage and shocking during storage will not develop "sandiness." In accordance with our invention, we have produced smooth, non-sandy ice cream having a total solids content in excess of 40% with a milk solids not fat content in the order of 15 or 16% and even higher, approximately one-half of this being lactose.

While we have not been able to definitely account for this phenomenon, it is our opinion that the treatment of the milk or like milk products with base exchange materials causes a change in the colloidal materials present therein which effectively prevents precipitation and crystallization of the lactose or milk sugar at the temperatures when these crystals would naturally and otherwise normally form. The treated milk solids appear to enable the water in the ice cream to carry in solution more than the usual 5.90% to 6.50% of lactose or milk sugar at the temperature of the frozen product. And while in excess of about 5.90% to 6.50% of lactose in ice cream as in the prior art will precipitate and crystallize out at the temperature of the frozen product, with an ice cream in accordance with our invention having in the order of about 7.80% to about 8.50% of lactose and even higher, no "sandiness" develops at the temperature of the frozen product or even after prolonged storage and shocking during storage. Moreover, the presence of base exchange treated milk solids in an ice cream mix of high solids not fat content enables the mix to attain the desired stiffness and overrun in a minimum time of freezing.

The ice cream produced in accordance with our invention additionally possesses natural melting properties, exceptional overrun qualities and other properties required in a good ice cream. Due to the incorporation in ice cream of base exchange treated milk products, the ice cream is rendered readily assimilable even by an infant. We have made low fat, high solids not fat, ice cream in accordance with our invention which has the smoothness, richness and flavor of the highest quality of product, even of high butter fat products; for example, an ice cream containing about 8% fat and about 16% milk solids not fat.

The following example illustrates the invention and the character of the milk solids not fat produced in accordance with the base exchange treatment step of our process. It is to be understood that by the expression "milk solids not fat," as used in the examples and throughout the specification, we mean milk solids not fat having therein normal proportions of lactose or milk sugar.

800 gallons of whole milk testing .15% acidity, calculated as lactic acid, and a pH of 6.50 are passed downflow through a 12 cubic foot bed of base exchange material of 30 to 60 mesh known in the trade as "Crystallite." After passage of the milk through the bed of base exchange material, a composite sample thereof was tested and found to have an acidity of .06% calculated as lactic acid, and a pH of 8.1.

The product resulting from the above treatment analyzed as follows:

|  | Per cent |
|---|---|
| Ash | 0.051 |
| CaO | 0.130 |
| $P_2O_5$ | 0.194 |

The total ash content of the milk product treated in accordance with our invention is less than that of the untreated milk. For purposes of comparison, the comparative analysis of the untreated whole milk was as follows:

|  | Per cent |
|---|---|
| Ash | 0.710 |
| CaO | 0.189 |
| $P_2O_5$ | 0.238 |

In general, the milk product treated with base exchange material in accordance with our invention may be neutral, or may have a titratable acidity of about 0.06% to say about 0.025%, or even, if desired, a titratable alkalinity of about 0.06%, the acidity and alkalinity being calculated as lactic acid. The pH of the treated product may vary rather widely from say about 6.8 to about 8.20 and even higher. The ash content of the treated product may vary from about 0.610% to about 0.710%; the content of calcium, determined as calcium oxide, is in general not over 0.154% and usually in the range of 0.126% to 0.140%; and the content of phosphorus pentoxide is in general not over 0.217% and is usually in the range of 0.193% to 0.211%.

After use in accordance with the present invention, the base exchange material may be revivified in any desirable manner for reuse as described above. For example, the spent material may be revivified by successive treatment with alkali metal hydroxides and an alkali metal halide as described in the patent to Lyman No. 1,954,769. I prefer, however, to revivify the spent material in accordance with the methods described in Patent No. 2,072,903 to one of us and Edwin H. Browne, or in Patent No. 2,102,642 to one of us, Edwin H. Browne and Maurice E. Hull.

It is, of course, to be understood that the base exchange material used in accordance with our invention, whether fresh or revivified, will preliminarily be washed to remove any excess alkali or other soluble compounds present as the result of any preliminary treatment or revivification process which may have been applied to the base exchange material. It is obviously important to maintain the base exchange material in sterile condition to avoid bacterial or other infection with resulting deleterious action upon the whole milk or like products containing milk solids not fat which are used in accordance with our invention in the preparation of ice cream and like frozen food products.

The treated whole milk or like treated product containing milk solids not fat in accordance with our invention is then concentrated in any desirable manner, for example, under vacuum, to a total solids content of about 30 to 35% and even higher and a milk solids not fat content of considerable variation depending, of course, on the original fat and solids not fat content of the untreated whole milk or like untreated product.

Thus, for example, if the untreated whole milk has a fat content of about 4% and a milk solids not fat content of about 9%, the product resulting from the base exchange and concentrating treatments may have a total solids content of about 35%, of which about 25% is milk solids not fat.

In preparing an ice cream in accordance with our invention, a treated and concentrated whole milk or like product as described above, either in liquid or dessicated form, may be blended into ice cream mixes of various compositions and proportions. The following is an example of such an ice cream mix:

| | | |
|---|---|---|
| Butter fat | per cent | 8 |
| Milk solids not fat | do | 16 |
| Sugar | do | 14.5 |
| Stabilizer | do | 0.3 |
| Water | do | 61.2 |
| Acidity | do | 0.09 |
| pH | | 7.20 |

The above fluid mix is pasteurized at 145° F. for 30 minutes, homogenized at a pressure of about 2500 lbs. gauge, cooled to about 40° F. and is then ready for freezing in any well-known manner.

In accordance with our invention, we have found that if only part of the desired milk solids not fat is treated with base exchange material as described above and incorporated in an ice cream mix, either in liquid or dessicated form, we can incorporate the remainder of the milk solids not fat in the form of untreated whole milk and the like, either in liquid or dessicated form, and obtain an ice cream which is free from "sandiness" and which has all the desired properties present in the ice cream described above. Thus, for example, we can make up an ice cream mix having a milk solids not fat content in excess of 11½ to 12% and up to 16% and higher, of which about 2% to 3.5% and up to about 10% and even higher is base exchange treated milk solids not fat, the remainder being untreated milk solids not fat. The following is a specific example of this modified form of my invention:

| | | |
|---|---|---|
| Butter fat | per cent | 12 |
| Milk solids not fat (untreated) | do | 10.3 |
| Milk solids not fat (base exchange treated) | per cent | 3.5 |
| Sugar | do | 14.5 |
| Stabilizer | do | 0.2 |
| Water | do | 59.5 |
| Acidity | do | 0.16 |
| pH | | 6.67 |

The above fluid mix may then be treated as described in connection with the preceding mix to form ice cream.

The above mixes may, if desired, be made up in powder form and then mixed with water, skim milk, whole milk and the like and formed into an ice cream mix.

In accordance with our invention, we have also found that by the aid of base exchange treated whole milk, skim milk or like products containing milk solids not fat we can produce a concentrated ice cream mix which can be cut back or reconstituted to form an ice cream mix which can then be frozen in the usual manner to form an ice cream. In carrying out this phase of our invention, we treat whole milk or skim milk or like products with base exchange material as described above. The treated fluid milk may, if desired, then be concentrated to have about 30% to about 35% or higher of total solids content, although this is not essential. The fluid milk, in unconcentrated or preferably in concentrated form, is then blended with the desired ingredients to form an ice cream mix. This mix is then pasteurized, homogenized in any desired manner under suitable pressure, say 2000 to 2500 lbs. gauge, and is then further condensed, preferably under vacuum to a total solids content of about 65% to about 72.5% or about 73% and slightly higher.

The concentrated ice cream mix produced as above described may then be cooled and packaged in suitable hermetically sealed containers and thus dispensed much in the same manner that sweetened condensed milk is now packaged and dispensed. The concentrated ice cream mix embodying our invention remains stable in the packages even after prolonged storage.

In use, the concentrated ice cream mix is removed from its package and is cut back with a suitable amount, say 1 to 1½ times its volume of water, whole milk, skim milk and the like, adding desired flavoring and coloring materials, to form a reconstituted ice cream mix ready to freeze in mechanical freezers or in the known type of refrigerator. In the latter instance I have produced satisfactory ice box ice creams. The following are illustrative examples of satisfactory concentrated ice cream mixes in accordance with my invention.

*Example 1*

| | Per cent |
|---|---|
| Butter fat | 17.71 |
| Milk solids not fat (base exchange treated) | 15.26 |
| Sugar | 37.70 |
| Sodium alginate | 0.70 |
| Egg yoke (dried) | 0.50 |
| Salt | 0.20 |
| Water | 27.93 |

*Example 2*

| | Per cent |
|---|---|
| Butter fat | 17.71 |
| Milk solids not fat (base exchange treated) | 13.26 |
| Sodium caseinate (edible) | 2.00 |
| Sugar | 37.70 |
| Sodium alginate | 0.70 |
| Egg yoke (dried) | 0.50 |
| Water | 27.93 |

The caseinate in the above example may suitably be any edible alkali metal caseinate, for example, the caseinate described in Patent No. 1,598,033 to Harper F. Zoller. The quantity of the caseinate in a concentrated ice cream mix in accordance with our invention may vary, for example, from about 0.5 to about 5% or higher and preferably from about 1.5% to 4% depending upon the amount of overrun desired in the ice cream. It appears that by the use of an alkali metal caseinate as set forth in Example 2, we can better control the amount of overrun of the ice cream made from the concentrated ice cream mix.

The ice creams and concentrated ice cream mixes produced in accordance with any of the methods heretofore described all have in excess of about 12% milk solids not fat and in excess of about 5.90 to 6.50% of lactose or milk sugar and at the same time possess a smooth consistency free from "sandiness" or crystallized lactose. From observations we have made, it appears that all of the lactose or milk sugar present in any of the ice creams embodying our invention is in a dissolved state. This observation has been particularly noted in respect to the lactose or milk sugar present in the concentrated ice cream mix prepared in accordance with our invention. As far as we are aware, up to the present time it has not been possible to make and hold sweetened condensed milk or any concentrated ice cream mix wherein the lactose or milk sugar in excess of that normally held in solution by the water present therein is in a dissolved (or uncrystallized) state. The sweetened condensed milk and the concentrated ice cream mixes, containing as a constituent an alkali metal caseinate and prepared in accordance with the prior art, have all exhibited lactose or milk sugar crystal formation when the milk sugar content of the product exceeded that which would normally be held in solution by the water present therein. It is obvious, for example, from Example 2 above, that we have produced a concentrated ice cream mix containing lactose or milk sugar in excess of the amount that would normally remain in solution in the water present. From observation, we have noted that all of the lactose is in a dissolved state in the ice cream concentrate produced in accordance with our invention, for instance, from the mix of Example 2.

The ice cream mixes in accordance with our invention are capable of attaining the desired stiffness and overrun in a minimum of freezing and the ice creams so produced are capable of withstanding heat shock during storage. In addition, all of these ice creams, while relatively low in fat content, nevertheless have all the attributes and characteristics of a relatively high butter fat content ice cream.

While we have set forth in the above examples specific ingredients and proportions thereof, it is obvious that our invention is not to be construed as limited thereto, since other equivalent ingredients and other proportions may serve equally well to produce satisfactory ice creams in accordance with our invention. While we have specifically described our invention in connection with the preparation of high milk solids not fat ice creams, it is obvious that it is also applicable to the preparation of relatively low milk solids not fat content ice creams as well as other frozen food products such as ices, frosted malted milks, custards, sherbets and the like containing either a high or a relatively low milk solids not fat content.

The expression "ice cream" in the claims is intended to include not only ice cream, but like frozen or partially frozen food products.

We claim:

1. The method of producing ice cream of smooth consistency and containing in excess of about 12% milk solids not fat, said milk solids not fat containing the usual proportions of lactose, comprising treating a liquid containing milk solids not fat with a base exchange substance, thereby modifying the milk solids not fat, incorporating the milk solids not fat into a mixture to bring the milk solids not fat content thereof to the desired percentage in excess of about 12% and freezing the mixture.

2. The method of producing ice cream of smooth consistency and containing in excess of about 12% milk solids not fat, said milk solids not fat containing the usual proportions of lactose, comprising treating without prior acidification a liquid containing milk solids not fat with a base exchange substance, thereby modifying the milk solids not fat, incorporating the milk solids not fat into a mixture to bring the milk solids not fat content thereof to the desired percentage in excess of about 12% and freezing the mixture.

3. The method of producing ice cream of smooth consistency and containing in excess of about 12% of milk solids not fat which comprises treating a liquid containing milk solids not fat with a base exchange substance, thereby modifying the milk solids not fat, incorporating the modified milk solids not fat along with unmodified milk solids not fat into a mixture to bring the total milk solids not fat content of the mixture to the desired percentage above 12% and freezing the mixture, said milk solids not fat containing the usual proportions of lactose.

4. An ice cream of smooth consistency containing in excess of 12% of base exchange treated milk solids not fat having therein the usual proportions of lactose.

5. An ice cream of smooth consistency containing in excess of 12% milk solids not fat, a portion of said milk solids not fat being base exchange treated milk solids not fat, said milk solids not fat containing the usual proportions of lactose.

6. A concentrated ice cream mix containing a total solids content in the order of about 65% to about 73%, a small portion of said total solids being an alkali metal caseinate and a second portion of said total solids being base exchange treated milk solids not fat having therein the usual proportions of lactose, said portion of base exchange treated milk solids not fat being in excess of 12% of the concentrate.

7. An ice cream of smooth consistency containing in the order of about 15 to about 16% of base exchange treated milk solids not fat having therein the usual proportions of lactose.

HERBERT E. OTTING.
JAMES J. QUILLIGAN.